US007818278B2

(12) United States Patent
Padovitz et al.

(10) Patent No.: US 7,818,278 B2
(45) Date of Patent: Oct. 19, 2010

(54) LARGE SCALE ITEM REPRESENTATION MATCHING

(75) Inventors: Amir J. Padovitz, Redmond, WA (US); Dima Suponau, Bellevue, WA (US); Wei Yu, Issaquah, WA (US); Mikhail Bilenko, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 11/763,200

(22) Filed: Jun. 14, 2007

(65) Prior Publication Data

US 2008/0313111 A1 Dec. 18, 2008

(51) Int. Cl.
G06N 5/02 (2006.01)
(52) U.S. Cl. ............................. 706/52; 706/45; 706/48; 706/55; 707/730; 707/750; 707/780; 707/917
(58) Field of Classification Search ..................... 706/8, 706/45, 46, 48, 52, 55, 62; 707/1, 2, 6
See application file for complete search history.

(56) References Cited

U.S. PATENT DOCUMENTS

| 5,794,236 | A | | 8/1998 | Mehrle | |
|---|---|---|---|---|---|
| 5,826,261 | A | | 10/1998 | Spencer | |
| 5,987,446 | A | * | 11/1999 | Corey et al. ........................ | 1/1 |
| 6,038,561 | A | * | 3/2000 | Snyder et al. ...................... | 1/1 |
| 6,389,436 | B1 | | 5/2002 | Chakrabarti | |
| 6,457,028 | B1 | | 9/2002 | Pitkow | |
| 6,738,780 | B2 | | 5/2004 | Lawrence | |
| 2004/0002849 | A1 | | 1/2004 | Zhou | |
| 2004/0260694 | A1 | * | 12/2004 | Chaudhuri et al. ............. | 707/5 |
| 2005/0289128 | A1 | | 12/2005 | Hamaguchi | |
| 2006/0041597 | A1 | * | 2/2006 | Conrad et al. ................ | 707/200 |

| 2006/0106767 | A1 | | 5/2006 | Adcock | |
|---|---|---|---|---|---|
| 2006/0149720 | A1 | * | 7/2006 | Dehlinger ...................... | 707/3 |

FOREIGN PATENT DOCUMENTS

| WO | 9712334 A1 | 4/1997 |
|---|---|---|
| WO | 2005038672 A1 | 4/2005 |
| WO | 2006115228 A1 | 11/2006 |

OTHER PUBLICATIONS

Lawrence et al., "Digital Libraries and Autonomous Citation Indexing", IEEE, 1999, pp. 1-8.*

(Continued)

*Primary Examiner*—Donald Sparks
*Assistant Examiner*—Omar F Fernandez Rivas
(74) *Attorney, Agent, or Firm*—Shook Hardy & Bacon

(57) ABSTRACT

A two-phase process quickly and accurately identifies representations of the same items within a collection of item representations. In the first phase, referred to as a "blocking phase," frequency information indicating the frequency with which terms appear within the collection of item representations is used to quickly identify "candidate pairs" (i.e., pairs of item representations that have a relatively high probability of matching). The blocking phase results in a reduced subset of the data for further analysis during the second phase. In the second phase, referred to as a "matching phase," the candidate pairs are analyzed using fuzzy matching functions to accurately identify "matching pairs" (i.e., representations of the same items).

14 Claims, 6 Drawing Sheets

OTHER PUBLICATIONS

Chaudhuri et al. "Robust and Efficient Fuzzy Match for Online Data Cleaning", SIGMOD 2003, pp. 313-324.*

Takenobu et al., "Text Categorization Based on Weighted Inverse Document Frequency" Tokyo Institute of Technology, 1994, pp. 1-8.*

Pasula, Hanna M, et al., Identity Uncertainty and Citation Matching, Advances in Neural Information Processing Systems 15, NIPS 2003, Cambridge, MA: MIT Press. http://people.csail.mit.edu/milch/papers/nipsnewer.pdf, 8 pages.

Lawrence, Steve, et al., Autonomous Citation Matching, Proceedings of the Third International Conference on Autonomous Agents, Seattle, Washington, May 1-5, ACM Press, New York, NY, 1999.. http://citeseer.comp.nus.edu.sg/cache/papers/cs/20430/http:zSzzSzwww.neci.nec.comzSz~lawrencezSzpaperszSzcs-aa99zSzcs-aa99.pdf/lawrence99autonomous.pdf, 8 pages.

Giles, C. Lee, et al., CiteSeer: An Automatic Citation Indexing System, Digital Libraries 98=Third ACE Conference on Digital Libraries, Edited by I. Witten, et al., ACM Press, New York, pp. 89-98, 1998. http://clgiles.ist.psu.edu/papers/DL-1998-citeseer.pdf.

* cited by examiner

LARGE SCALE ITEM REPRESENTATION MATCHING

BACKGROUND

Many data driven applications, including web-based applications, typically rely heavily on and use textual data that originates from different and diverse data sources. This often results in multiple and different representations of the same items (or entities) in the data. For instance, a data set may include a collection of citations that represent academic publications, and there may be multiple citations within the collection that represent the same academic publications. However, because these citations may originate from a variety of different sources, the various citations that represent the same academic publications may differ. In particular, the citations may include numerous variations, such as listing all authors or only partial authors, using abbreviations, including or excluding different elements (e.g., author, title, venue, volume information, page information, publication date, etc.), including misspellings, and reordering elements to name a few.

Recognizing these different (and possibly erroneous) representations of the same items facilitates consolidating and cleaning the data and creating cohesion in the data. In some cases, only by matching representations of items in the data may particular applications be applied. However, it is difficult to obtain high accuracy in matching between different representations of the same item. The difficulty is further exacerbated when matching is to be performed over a large collection of data.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments relate to a two-phase process for quickly and accurately identifying representations of the same items within a collection of item representations. In the first phase, or "blocking phase," information indicative of the frequency with which terms appear within the collection of item representations is used to quickly identify "candidate pairs" (i.e., pairs of item representations that have a relatively high probability of matching). The blocking phase results in a reduced subset of the data for further analysis during the second phase. In the second phase, or "matching phase," the candidate pairs are analyzed using fuzzy matching functions to accurately identify "matching pairs" (i.e., representations of the same items).

BRIEF DESCRIPTION OF THE DRAWINGS

The present invention is described in detail below with reference to the attached drawing figures, wherein.

DETAILED DESCRIPTION

Figure 1:
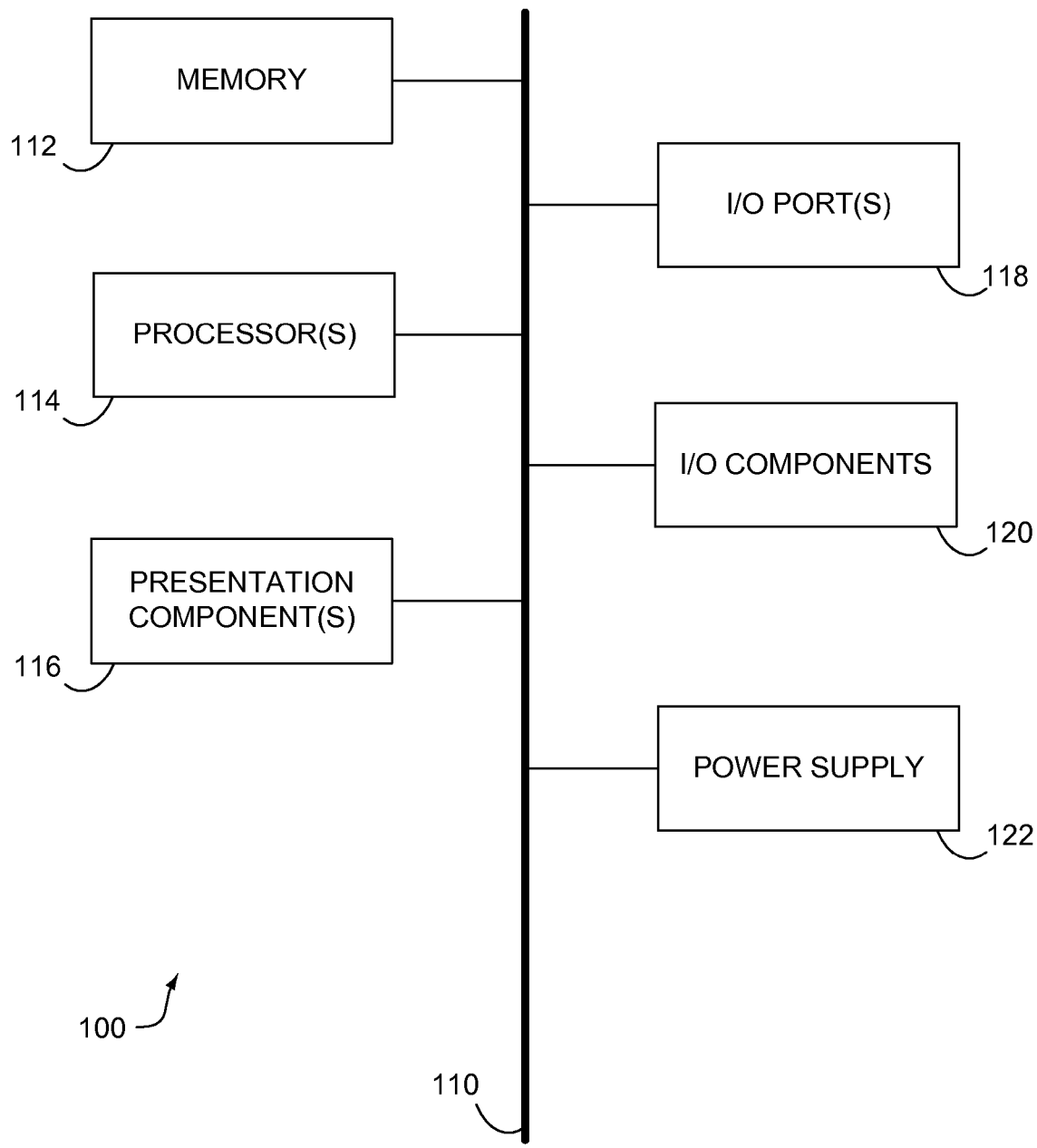
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention facilitate matching item representations using a two-phase process that includes a "blocking phase" and a "matching phase." The process provides a fast and accurate approach to identify representations of the same items or entities within a data set. For instance, the process may be used to identify citations corresponding to the same publications or to identify representations of the same events within a collection of event information (e.g., concerts, plays, movies, etc.). While embodiments of the invention will be further illustrated herein primarily in the context of academic citations, one skilled in the art will recognize that the process may also be applied to representations of other types of items.

The first phase, or "blocking phase," applies a fast but crude matching algorithm over the complete data. The blocking phase results in a highly reduced subset of the data that contains candidate pairs of item representations with high probability of being actual matches. The blocking phase determines candidate pairs using frequency information indicating the frequency of terms appearing in the collection of item representations. In some embodiments, an inverted index is generated that maps terms to item representations in which the terms appear. The inverted index also includes an inverse document frequency (IDF) score for each term indicating the frequency of the term within the collection of item representations. The inverted index is then employed to identify the candidate pairs.

Although the blocking phase quickly identifies pairs of item representations that have a relatively high probability of matching, the results are not highly accurate. Accordingly, the second phase, or "matching phase," operates on the set of candidate pairs determined during the blocking phase to identify matching pairs with high accuracy. In the matching phase, the candidate pairs are analyzed using fuzzy matching functions to determine if each candidate pair should be considered a matching pair, indicating that the pair of item representations represent the same item. In some embodiments, the matching phase combines a library of reusable fuzzy matching functions and a decision tree based classifier. In such embodiments, different fuzzy matching functions may be applied to different segments of the item representations based on the suitability of the fuzzy matching functions for the various segments. The classifier then combines the results of the fuzzy matching functions that are applied to the different segments of the candidate pair to determine if the candidate pair is a matching pair.

Matching representations of the same items facilitates removing redundancy and cleaning the data, as well as allowing different applications to be applied. For instance, in the case of academic citations, identifying matching citations (i.e., citations that represent the same publication) enables a variety of applications, such as, for instance, performing static ranking for academic web search, grouping together different sources of the same article, and introducing a "cited by" feature.

Embodiments of the invention also provide an approach that is highly scalable as the design of the blocking phase allows blocking to be performed over subsets of data by multiple machines. Accordingly, to determine candidate matches (i.e., blocks) for a set of item representations A from a set of target item representations B, multiple machines may be used with each machine examining a subset of both set A and set B. In other words, not only can blocking be performed over a subset of source information but can also be performed on a subset of target information. Results from the various machines may then be aggregated together. This property enables massive scaling, parallel execution, and distribution of both blocking and matching (since matching is performed over the results of blocking).

Accordingly, in one aspect, an embodiment of the invention is directed to a computerized method for matching item representations within a collection of item representations. The method includes determining candidate pairs of item representations based on frequency information indicative of the frequency at which terms appear in the collection of item representations. The method also includes matching item representations by analyzing the candidate pairs using one or more fuzzy matching functions.

In another embodiment of the invention, an aspect is directed to one or more computer-readable media embodying computer-useable instructions for performing a method of matching item representations from a collection of item representations. The method includes extracting terms from the collection of item representation and determining frequency information indicative of the frequency with which the terms appear within the collection of item representations. The method also includes generating an inverted index mapping the terms to the item representations in which the terms appear, wherein the inverted index further includes the frequency information for the terms. The method further includes determining one or more candidate pairs of item representations using the inverted index based on terms shared between item representations and frequency information associated with the terms. The method still further includes identifying one or more matching pairs of item representations by analyzing the candidate pairs using the fuzzy matching algorithms.

A further aspect of the invention is directed to a computerized system including one or more computer-readable media embodying software components for matching item representations from a collection of item representations. The software components include a blocking component that identifies candidate pairs of item representations based on frequency information associated with terms shared between the candidate pairs. The software components also include a matching component that identifies matching pairs of item representations by analyzing the candidate pairs using one or more fuzzy matching algorithms.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other storage medium that can be used to encode and store desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
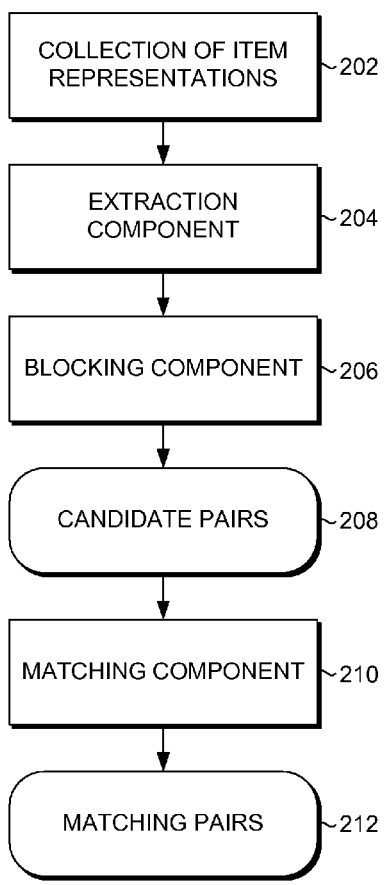
FIG. 2 is a block diagram showing an exemplary system for matching item representations in accordance with an embodiment of the present invention.

Referring now to FIG. 2, a block diagram is provided illustrating an exemplary system 200 for matching representations of items in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 facilitates matching representations of the same items within a collection of item representations 202. The collection of item representations 202 may generally include representations of items from data that originates from different and diverse data sources. As a result, the collection 202 may include representations of the same items that differ in content and form. Accordingly, the system 200 facilitates identifying representations of the same items.

The collection of item representations 202 may be maintained by one or more computing devices that are accessible by an extraction component 204. The extraction component 204 scans the item representations within the collection 202 and extracts data regarding terms appearing in the item representations and frequency information indicative of the frequency with which the terms appear within the collection 202. In various embodiments of the invention, terms extracted from the item representations may include individual words and/or phrases.

As will be described in further detail below, the frequency information may be used by the blocking component 206 as a measure of a term's importance for matching. In particular, terms that are common and appear frequently within the collection of item representations 202 are not likely to provide a good indication that item representations sharing those common terms are matching. Conversely, terms that are rare and appear less frequently within the collection of item representations 202 are likely to provide a good indication that item representations sharing those rare terms are matching. In some embodiments, the frequency information comprises an IDF score calculated for each term based on the frequency with which each term appears in the collection 202. In further embodiments, an inverted index is generated that maps terms to the item representations containing the terms and includes the IDF score for each term.

The data extracted by the extraction component 204 is used by the blocking component 206 to identify candidate pairs 208. As such, the blocking component 206 quickly reduces the large collection of items 202 into a subset of candidate pairs 208 that have a relatively higher probability of being a matching pair (i.e., a pair of representations of the same item). To identify candidate pairs, the blocking component 206 examines terms shared between pairs of item representations taking into account frequency information associated with each of the terms. If a pair of item representations share terms having a sufficient level of importance (based on frequency information), the pair is considered a candidate pair.

The matching component 210 analyzes each of the candidate pairs identified by the blocking component to determine if a candidate pair is a matching pair with high accuracy. The matching component 210 applies fuzzy matching functions to each candidate pair to determine if the candidate pair represent the same item. In some embodiments, a single fuzzy matching function may be applied to a candidate pair to determine if the candidate pair is a matching pair. In other embodiments, corresponding segments with each item representation may be identified, and a suitable fuzzy matching function may be applied to each segment. A decision tree classifier then combines the results of the fuzzy matching functions for each of the different segments to determine if the candidate pair is a matching pair.

Figure 3:
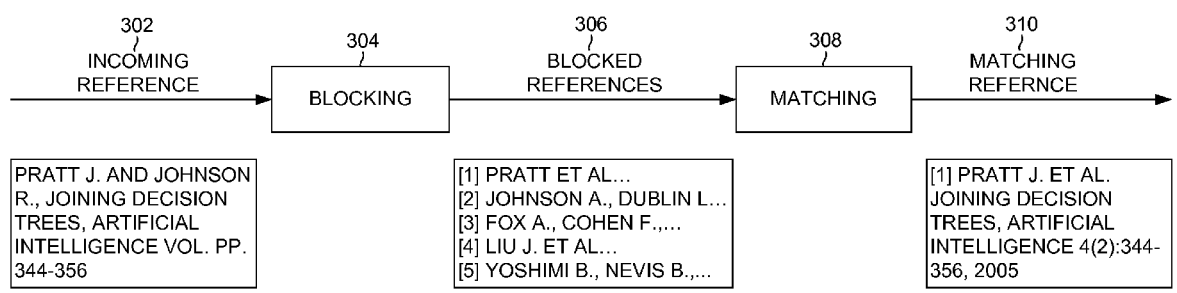
FIG. 3 is a flow diagram illustrating an example of the blocking and matching phases of an embodiment of the present invention.

The overall process for identifying matching item representations will now be further illustrated using a specific example in the context of academic citations with reference to FIG. 3. As shown in FIG. 3, an incoming citation 302 is received at the blocking phase 304. In the present example, the incoming reference is a citation for an academic publication: "Pratt J. and Johnson R., Joining Decision Trees, Artificial Intelligence Vol. pp. 344-356." The blocking phase 304 employs frequency information from a collection of citations to identify citations within the collection that have a probability of matching the incoming citation 302. Accordingly, the outcome of the blocking phase 304 is a number of blocked citations 306, which comprise a subset of all citations within the collection. Each of the blocked citations 306 identified during the blocking phase 304 in conjunction with the incoming reference 302 comprise a candidate pair having a probability of representing the same academic publication. The candidate pairs (i.e., each block citation 306 and the incoming citation 302) are analyzed during the matching phase 308 using one or more fuzzy matching algorithms to identify citations that match the incoming citation 302. In the present example, the first citation in the blocked citations 306 is identified as a matching citation 310.

Figure 4:
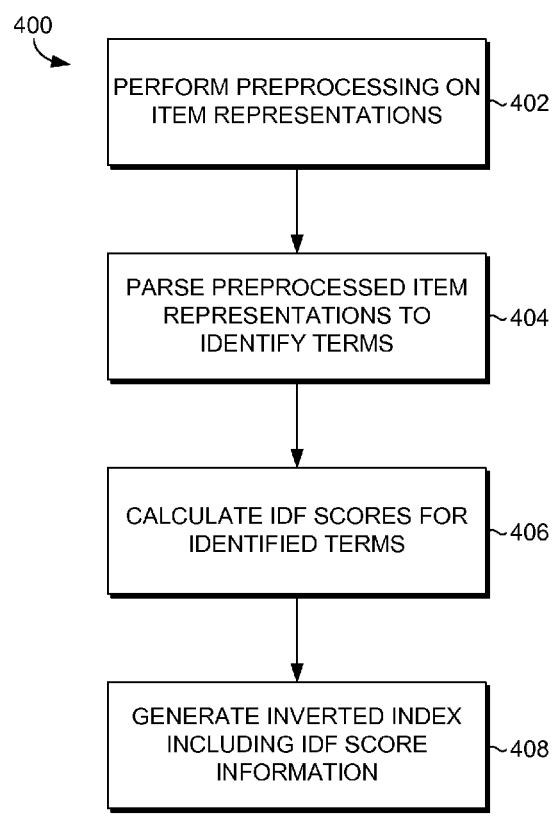
FIG. 4 is a flow diagram showing an exemplary method for generating an inverted index to facilitate blocking and identify candidate pairs in accordance with an embodiment of the present invention.

As indicated previously, in some embodiments of the invention, an inverted index is generated to facilitate the blocking phase. With reference to FIG. 4, a flow diagram is provided showing a method for generating an inverted index to facilitate blocking and identifying candidate pairs for matching in accordance with an embodiment of the present invention. Initially, as shown at block 402, a collection of item representations is preprocessed. Preprocessing may include a number of different steps to normalize and prepare the data for further processing within various embodiments of the invention. For instance, preprocessing may include removing delimiters, such as commas and quotes, and lowercasing all characters in the data.

As shown at block 404, the preprocessed item representations are parsed to identify and extract terms from the item representations. In some embodiment, individual words may be extracted from the item representations and identified as terms. In other embodiments, phrasal extraction may also be employed to identify extract phrases, such as "tropical storm" or "human embryo." Each phrase may then be treated as a discrete term and included in the list of terms for the item representations. In some embodiments of the invention, stopword filtering may be applied to identify and filter out stop words (i.e., words that are unimportant to determining matching pairs such as "the" and "a").

After parsing the item representations to identify terms, an IDF score is determined for the extracted terms, as shown at block 406. The IDF scores are used as a measure of the general importance of terms for matching item representations. The IDF score for each term is a function of the frequency of term in the collection of item representations. The greater the frequency of a term in the collection (i.e., a common word), the less likely the term will provide a good indication of matching between item representations. Conversely, the lower the frequency of a term in the collection (i.e., a rare word), the more likely the term will provide a good indication of matching between item representations.

An inverted index is generated using the frequency information, as shown at block 408. The inverted index maps the extracted terms to the item representations containing the terms. Additionally, the inverted index includes the IDF score calculated for each of the extracted terms. As indicated previously, the inverted index may be used in the blocking phase to quickly and efficiently determine candidate pairs for analysis during the matching phase.

Figure 5:
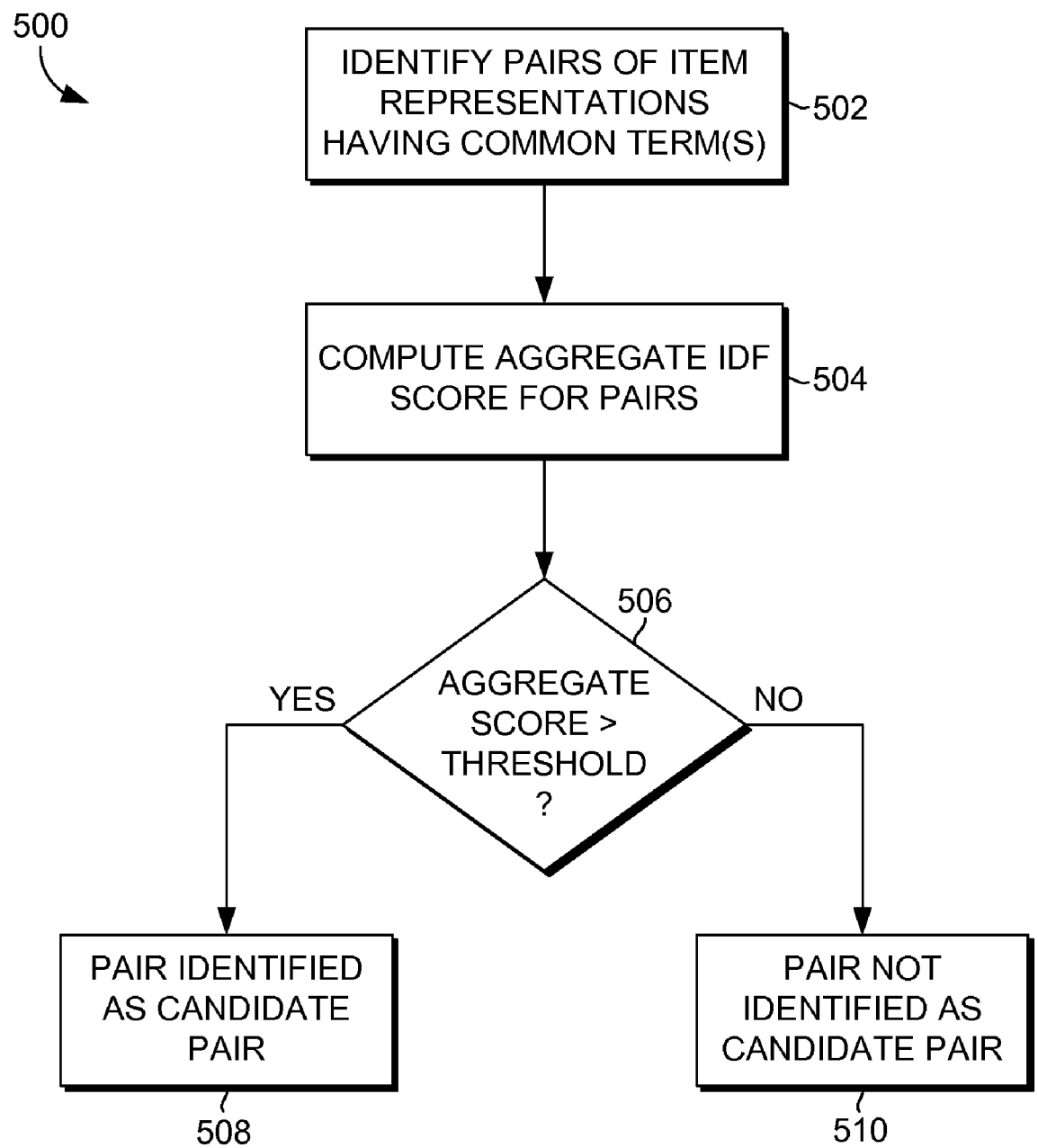
FIG. 5 is a flow diagram showing an exemplary method for identifying candidate pairs based on frequency information in accordance with an embodiment of the present invention.

As discussed previously, frequency information is used during the blocking phase to determine the likelihood that pairs of item representations are matching pairs. In particular, if a pair of item representations has rare terms (i.e., terms have a low frequency within the collection of item representations) in common, there is a greater likelihood that the item representations are a matching pair. A variety of algorithms may be employed to determine candidate pairs during the blocking phase using the frequency information. By way of example only and not limitation, FIG. 5 illustrates a flow diagram showing one method 500 for determining candidate pairs based on frequency information in accordance with an embodiment of the present invention. As shown at block 502, pairs of item representations having one or more terms in common are identified. An aggregate IDF score is then computed for each identified pair by aggregating the IDF score for all terms in common for each pair, as shown at block 504. In some embodiments, an inverted index such as that generated in accordance with the method 400 of FIG. 4 may be employed to determine the aggregate IDF score for each pair.

The aggregate IDF score for a pair of item representations is then employed as an indicator of the likelihood that the pair qualifies as a matching pair. In particular, the aggregate IDF score for each pair is compared against a predetermined threshold at block 506 to determine if the pair should be considered a candidate pair for analysis during the matching phase. If the aggregate IDF score for a pair is greater than the threshold, the pair is identified as a candidate pair, as shown at block 508. Conversely, if the aggregate IDF score for a pair is less than the threshold, the pair is not identified as a candidate pair, as shown at block 510.

Figure 6:
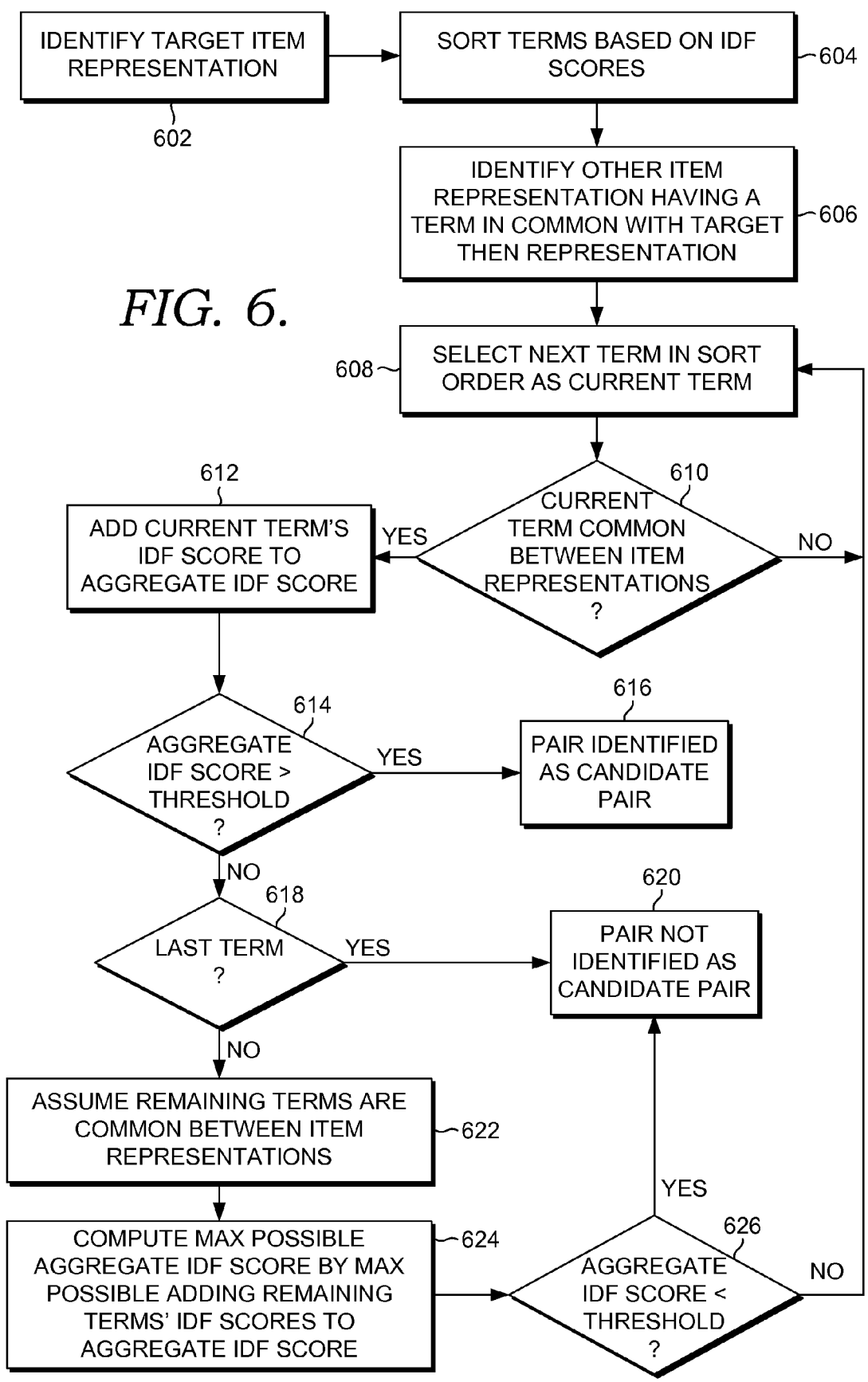
FIG. 6 is a flow diagram showing an exemplary method for using an iterative process to identify candidate pairs in accordance with an embodiment of the present invention.

In another embodiment of the invention, an algorithm is employed during the blocking phase that is designed on an IDF-based inverted index (such as that generated in accordance with the method 400 of FIG. 4) and introduces "shortcuts" that accelerate the overall running time of the blocking phase. Instead of aggregating IDF scores for all terms in common between a pair of item representations as that performed in the method 500 of FIG. 5, an iterative process is employed in which terms for a given item representation are prioritized based on importance (i.e., IDF score) and considered in turn based on this priority. With reference to FIG. 6, a flow diagram is provided showing a method 600 for blocking using an iterative algorithm providing "shortcutting" in accordance with an embodiment of the invention. The method 600 may be performed for each item representation in a collection to identify blocked item representations for each given item representation. Accordingly, as shown at block 602, a target item representation is identified. The terms for the item representation are sorted in order of their respective IDF scores such that the more important terms (i.e., terms having higher IDF scores) appear first in the sorted order, as shown at block 604. Additionally, an item representation having at least one term in common with the target representation is identified, as shown at block 606.

The process continues at block 608, at which the next term in the sort order is selected as the current term. If this is the first iteration, the first term, which has the highest importance based on IDF score, is selected as the current term. As shown at block 610, whether the current term exists in both of the item representations is determined. If the term is not common between the two item representations, the process returns to block 608, at which the next term in the sort order is selected. Alternatively, if the current term exists in both item representations, the term's IDF score is added to an aggregate IDF score for the pair, as shown at block 612. Again, if this is the first iteration, the aggregate IDF score will be the IDF score for the first term shared by the item representations. The aggregate IDF score is then compared against a threshold at block 614 to determine whether the pair should be considered a candidate pair for further matching analysis. If the aggregate score is above the threshold, the pair is identified as a candidate pair, as shown at block 616. Conversely, if the aggregate score is below the threshold, a determination is made whether the current term is the last term from the target item representation, as shown at block 618. If the current term is the last term, the pair is not identified as a candidate pair at block 620.

Alternatively, if the current term is not the last term, a prediction is made regarding whether a threshold will ever be reached for the current pair of item representations given the shared terms already considered and the remaining terms from the target representation. This consideration allows shortcutting if it is predicted the threshold will not be reached for the pair. To perform this predication, the remaining terms from the target representation are assumed to be shared between the item representations, as shown at block 622. Additionally, a maximum possible aggregate score is computed by adding the remaining terms' IDF scores to the current aggregate IDF score, as shown at block 624. This maximum possible aggregate IDF score is then compared against the threshold, as shown at block 626. If the maximum possible aggregate IDF score is less than the threshold, the pair is not identified as a candidate pair, as shown at block 620. Alternatively, if the maximum possible aggregate score is greater then the threshold, the process iterates to the next term in the sort order at block 608 and the process is repeated using the next term as the current term.

As discussed previously, after candidate pairs have been identified during the blocking phase, the candidate pairs are analyzed using fuzzy matching functions to accurately identify those candidate pairs that represent matching pairs. Any of a variety of fuzzy matching functions may be employed with the scope of embodiments of the present invention. By way of example only and not limitation, the fuzzy matching functions may include: string edit distances (e.g., Levenshtein, Needleman-Wunsh, Smith-Waterman distance), Jaccard distance, TF-IDF cosine similarity, Soft TF-IDF, SoundEX distance. These functions may be applied based on characters, tokens, character n-grams, or token n-grams.

In some embodiments, a single fuzzy matching function may be applied to the item representations as a whole or to a portion of the item representations to determine if the item representations are matching. In further embodiments, however, different segments of the item representations may be identified and fuzzy matching algorithms suitable for matching the different segments may be applied. For instance, a citation for a publication may include segments such as author, title, and venue. Each of these segments have different characteristics. For example, some segments may be more likely to include abbreviations, changes in word order, or other variations. Accordingly, fuzzy matching functions may be selected for each of the segments based on each fuzzy matching functions suitability for handling such characteristics and variations. If different fuzzy matching functions are applied to various segments of item representations, a decision tree classifier may combine the results of the various fuzzy matching functions to determine if a candidate pair is a matching pair.

Figure 7:
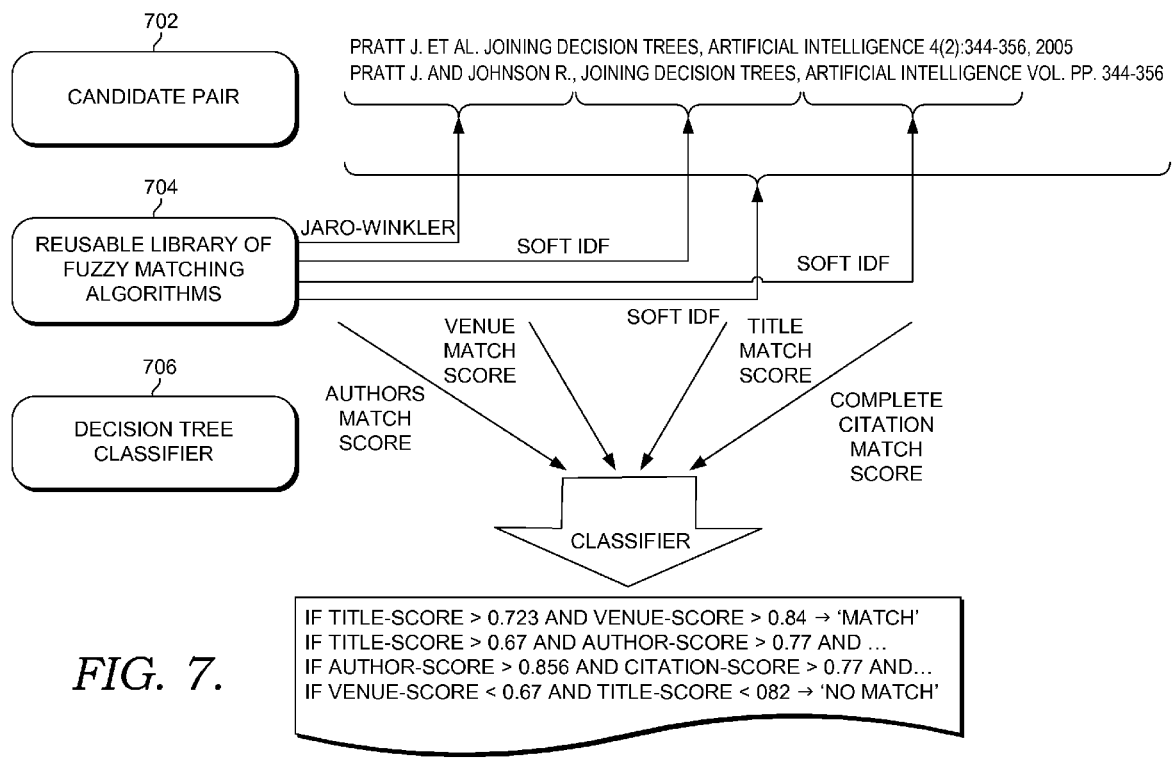
FIG. 7 is a diagram illustrating an example of a matching phase for a candidate pair using a library of fuzzy matching functions in accordance with an embodiment of the present invention.

By way of example, FIG. 7 illustrates a matching phase using a library of fuzzy matching functions 704 applied to different segments of a candidate pair 702. In the example of FIG. 7, the candidate pair 702 being analyzed is a pair of citations that include the segments: title, author, and venue. Accordingly, fuzzy matching functions from the library 704 are applied to each of the segments based on the suitability of each fuzzy matching function for the different segments. Additionally, a fuzzy matching function is applied to the item representations as a whole. The results of the fuzzy matching functions are combined using a decision tree classifier 706 to determine whether the candidate pair is a matching pair.

As can be understood, embodiments of the present invention provide a two-phase process for quickly and accurately identifying representations of the same items within a collection of item representations. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method for matching item representations within a collection of item representations, the method comprising:
   determining candidate pairs of item representations based on frequency information indicative of the frequency at which terms appear in the collection of item representations, wherein the frequency information comprises an IDF score determined for each term based on the respective term's frequency of use within the collection of item representations, and wherein determining candidate pairs comprises determining an aggregate IDF score for pairs of item representations by adding the IDF scores for terms shared by each pair of item representations and comparing the aggregate IDF score for each pair of item representations against a threshold to determine if each pair of item representations qualifies as a candidate pair; and
   matching item representations by analyzing the candidate pairs using one or more fuzzy matching functions.

2. The computerized method of claim 1, wherein the item representations comprise citations of publications.

3. The computerized method of claim 1, wherein the terms appearing in the collection of item representations comprises at least one of individual words and phrases.

4. The computerized method of claim 1, wherein determining candidate pairs comprises sorting terms from a target item representation based on IDF score; and iterating through the sorted terms in a manner such that at each iteration: (1) an aggregate IDF score is determined based on whether a current term and previously iterated terms are shared between the target item representation and a second item representation and (2) the aggregate IDF score is compared against a threshold to determine if the target item representation and second item representation comprise a candidate pair.

5. The computerized method of claim 4, wherein determining candidate pairs further comprises, at each iteration, predicting whether it is possible for the target item representation and second item representation to be identified as a candidate pair by assuming remaining terms from the target item representation are shared by the second item representation.

6. The computerized method of claim 1, wherein matching item representations comprises identifying different segments within the item representations and applying fuzzy matching functions suitable for each of the different segments.

7. The computerized method of claim 6, wherein matching item representations further comprises employing a decision tree classifier to combine results from the fuzzy matching algorithms.

8. One or more computer-readable storage media embodying computer-useable instructions for performing a method of matching item representations from a collection of item representations, the method comprising:
   extracting terms from the collection of item representation;
   determining frequency information indicative of the frequency with which the terms appear within the collection of item representations, wherein the frequency information comprises an IDF score calculated for each term;
   generating an inverted index mapping the terms to the item representations in which the terms appear, wherein the inverted index further includes the frequency information for the terms;
   determining one or more candidate pairs of item representations using the inverted index based on terms shared between item representations and frequency information associated with the terms by determining aggregate IDF scores for pairs of item representations based on terms shared between each pair of item representations and comparing the aggregate IDF scores against a threshold; and
   identifying one or more matching pairs of item representations by analyzing the candidate pairs using one or more fuzzy matching algorithms.

9. The one or more computer-readable storage media of claim 8, wherein the item representations comprise citations of publications.

10. The one or more computer-readable storage media of claim 8, wherein the terms comprises at least one of individual words and phrases.

11. The one or more computer-readable storage media of claim 8, wherein determining one or more candidate pairs comprises:
- sorting terms from a target item representation based on the IDF score for each term; and
- analyzing whether a second item representation and the target item representation comprise a candidate pair by iterating through the sorted terms and determining at each iteration whether the target item representation and second item representation are a candidate pair and whether further iterations are necessary.

12. The one or more computer-readable storage media of claim 8, wherein identifying one or more matching pairs comprises:
- identifying different segments within the item representations;
- determining a suitable fuzzy matching function for each of the different segments;
- applying the fuzzy matching functions; and
- employing a decision tree classifier to combine the results of the fuzzy matching functions to identify the one or more matching pairs.

13. A computerized system including one or more computer-readable media embodying software components for matching item representations from a collection of item representations, the software components comprising:
- a blocking component that identifies candidate pairs of item representations based on frequency information associated with terms shared between the candidate pairs, wherein the blocking component identifies candidate pairs of item representations by determining aggregate IDF scores based on the frequency information associated with terms shared between pairs of item representations and comparing the aggregated IDF scores against a threshold; and
- a matching component that identifies matching pairs of item representations by analyzing the candidate pairs using one or more fuzzy matching algorithms.

14. The computerized system of claim 13, wherein the matching component identifies matching pairs by identifying different segments within the item representations and applying fuzzy matching functions suitable to the different segments and employing a decision tree classifier to combine the results of the fuzzy matching functions to identify matching pairs.

* * * * *